United States Patent [19]
Spalding et al.

[11] Patent Number: 5,811,676
[45] Date of Patent: Sep. 22, 1998

[54] MULTIPLE FLUID METER ASSEMBLY

[75] Inventors: Robert George Spalding, Salisbury, Md.; Ken Taylor, Austin, Tex.

[73] Assignee: Dresser Industries, Inc., Dallas, Tex.

[21] Appl. No.: 847,693

[22] Filed: Apr. 28, 1997

Related U.S. Application Data

[60] Continuation of Ser. No. 735,215, Oct. 22, 1996, Pat. No. 5,686,663, which is a division of Ser. No. 497,930, Jul. 5, 1995, Pat. No. 5,648,606.

[51] Int. Cl.⁶ ........................................................ G01F 3/08
[52] U.S. Cl. ............................... 73/247; 92/5 R; 92/140; 73/197
[58] Field of Search ............................ 73/239, 240, 241, 73/247, 273, 197, 198, 195; 92/5 R, 140

[56] References Cited

U.S. PATENT DOCUMENTS

| 1,331,159 | 2/1920 | Lambert | 73/197 |
| 2,756,726 | 7/1956 | Ainsworth | 91/180 |
| 3,677,084 | 7/1972 | Masson et al. | 73/197 |
| 5,099,697 | 3/1992 | Agar | 73/195 |

Primary Examiner—Richard Chilcot
Assistant Examiner—Harshad Patel
Attorney, Agent, or Firm—Haynes and Boone, L.L.P.

[57] ABSTRACT

A fluid meter assembly in which a housing is provided that has two enclosures formed therein. At least one cylinder is formed in each enclosure and receives a piston. Fluid is admitted into each cylinder to drive its piston and pass the fluid through a corresponding outlet in the corresponding enclosure to enable the fluid flow to be metered.

26 Claims, 7 Drawing Sheets

5,811,676

MULTIPLE FLUID METER ASSEMBLY

CROSS-REFERENCE TO RELATED APPLICATION

This is a continuation application of application Ser. No. 08/735,215 filed Oct. 22, 1996 U.S. Pat. No. 5,686,663, which is a division of application Ser. No. 08/497,930 Jul. 5, 1995 U.S. Pat. No. 5,648,606.

BACKGROUND OF THE INVENTION

This invention relates to a meter assembly for measuring the volume of a fluid that flows through a line and, more particularly, to such an assembly for measuring the volume of a fluid dispensed from multiple fluid dispensers.

Fluid meters are in widespread use. For example, gasoline dispensing pumps employed for the retail sale of motor fuel include a fluid meter through which gasoline flows, thereby providing a means for determining the quantity of gasoline dispensed. The meter, in turn, is connected to a register which indicates the quantity dispensed, typically in terms of gallons and price.

A meter commonly utilized for such gasoline dispensers is disclosed in U.S. Pat. No. 2,756,726 to Ainsworth. In that disclosure, a meter comprises a multiple piston-in-cylinder hydraulic motor, wherein admission of liquid to the ends of the pistons causes reciprocation thereof, to effect the rotation of a shaft which is adapted to be connected to the register. A rotary valve, coupled to the shaft, admits liquid to the cylinders or permits flow to the outlet connection, in proper timed relation. As distinguished from such meters as the four cylinder cruciform type, or the two-cylinder full double acting arrangement, the Ainsworth meter incorporates the principle of limiting the number of actual cylinders and maintaining desired capacity by providing what may be termed a "blind" or "hypothetical" piston and cylinder, mechanically and hydraulically cooperating with those which are structurally existent.

Ainsworth accomplishes this by so arranging the various ports and the rotary valve that liquid is admitted sequentially to both the crankcase and the head ends of the cylinders in such a manner that the volume admitted to, or withdrawn from, the crankcase is equal to the algebraic sum of the volume withdrawn from, or admitted to, the head ends of the cylinders. Two pistons, actuated through the valve mechanism advantageously one hundred and twenty degrees out of phase, thus perform the work equivalent of three pistons. The utilization of this principle accordingly reduces the actual number of cylinders required for a given capacity, with the advantages of reduction of internal friction and pulsation, smoother operation, and also with attendant reduction in manufacturing costs.

The Ainsworth fluid meter, however, is deficient in several respects. For example, because the cylinders are oriented one hundred and twenty degrees apart, they require special piston guide barrels which, together with the cylinders, are bulky and consume a large quantity of space in the crowded cabinet of a typical gasoline multigrade dispenser. Furthermore, it is difficult to mold or cast and machine a housing for such an arrangement of cylinders and guide barrels. Still further, the cylinders require special porting between the valve and the cylinders which restricts the flow of fluid therethrough and decreases meter efficiency. Moreover, an external shaft must extend through the meter housing to drive the register, thus increasing the susceptibility of the meter to leakage.

Still another disadvantage of the Ainsworth design, as well as other prior fluid meters, is that they do not lend themselves to stations having multiple gasoline pumps. More particularly, several advantages would be realized if a plurality of flow meters could be integrated into a single assembly. For example, a multiple flow meter wherein two fluid meters are integrated together would facilitate the construction of gasoline dispenser pump stations having two, four, six, or eight gasoline fueling points since it would require a single meter body, meter dome, and end cover, thereby economizing on physical size and manufacturing costs. Installation of a multiple flow meter assembly would be facilitated as a result of simplified mounting and pipe work and the reduced cabinet size for housing the assembly. Flexibility is also enhanced because a multiple flow meter could also serve a single hose outlet at twice the speed of delivery of a single unit flow meter.

SUMMARY OF THE INVENTION

It is therefore an object of the present invention to provide a multiple fluid meter assembly in which a multiple meter assembly that can service two, four, six, or eight gasoline dispensers is provided which has a single meter body, meter dome, and end cover.

To this end, the fluid meter assembly of the present invention includes a housing having two parallel enclosures formed therein. At least one cylinder is formed in each enclosure and receives a piston. Fluid is admitted into each cylinder to drive its piston and pass the fluid through a corresponding outlet in the corresponding enclosure. As a result, the fluid flow through each enclosure can be metered.

The multiple meter assembly of the present invention enjoys the advantages of being relatively inexpensive to manufacture and easy to install as a result of simplified mounting and pipe work and the need for a relatively small cabinet for housing the assembly. The flexibility of the installation is also enhanced because a multiple flow meter could also serve a single hose outlet at twice the speed of delivery of a single unit flow meter.

BRIEF DESCRIPTION OF THE DRAWINGS

The above objects and summary, as well as further objects, features and advantages of the present invention will be more fully appreciated by reference to the following detailed description of the presently preferred, but nevertheless illustrative, embodiments of the present invention when taken in conjunction with the accompanying drawings wherein.

DESCRIPTION OF THE PREFERRED EMBODIMENTS

Figure 1:
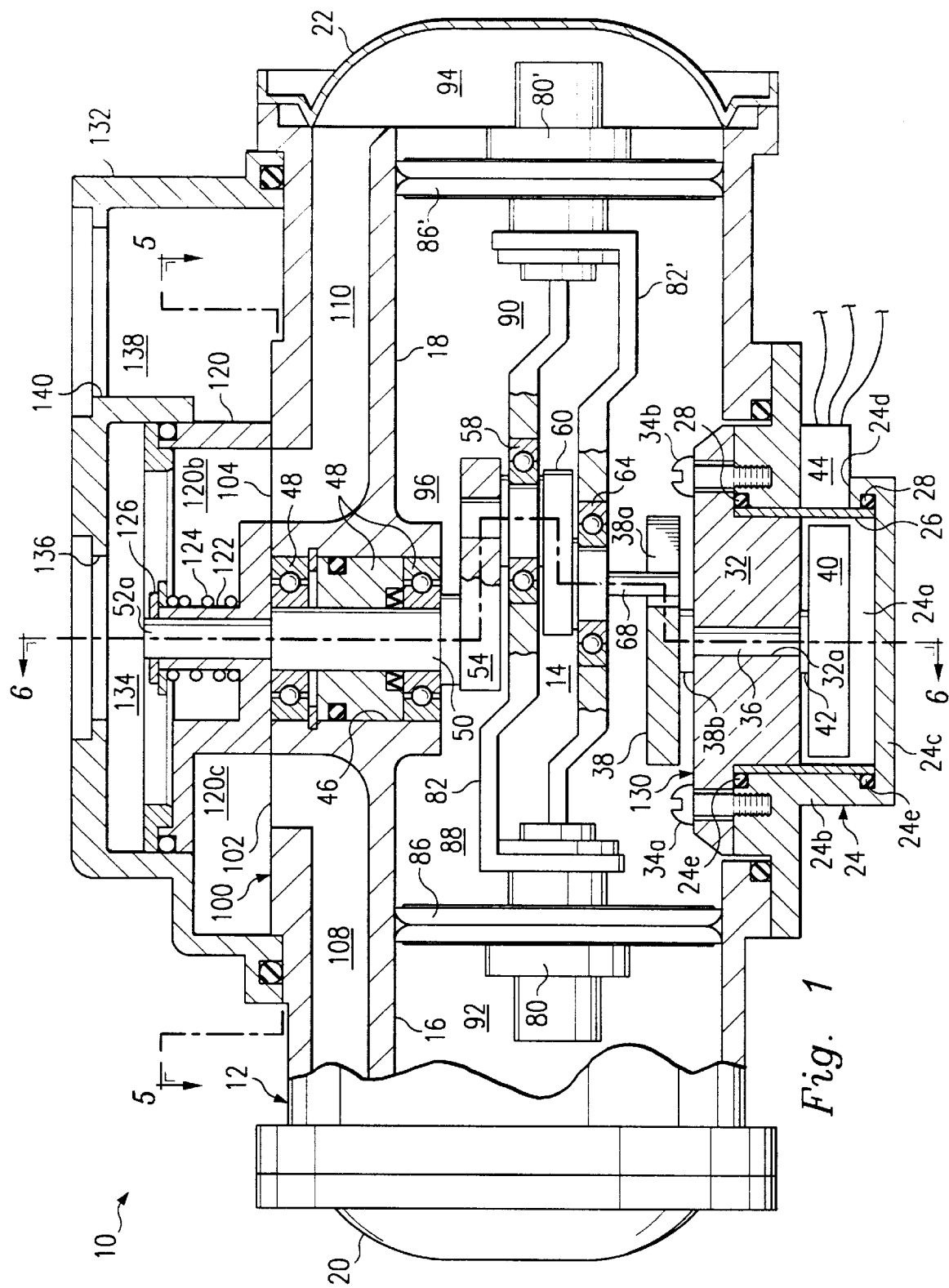
FIG. 1 is an elevational cross-sectional view of a first embodiment of a fluid meter of the present invention.

In FIG. 1, the reference numeral 10 designates a flow meter embodying features of the present invention. The meter 10 includes a flow meter body 12 having a crankcase portion 14 and opposing, axially-aligned, hollow first and second cylinder portions 16 and 18, respectively, extending outwardly from the crankcase portion 14. The head ends of the cylinder portions 16 and 18 are capped by first and second head end cover plates 20 and 22, respectively. The bottom of the crankcase portion 14 is sealed by a removable base cover 24 having a well portion 24a defined by a cylindrical wall 24b extending downwardly and a closed bottom end 24c. An opening 24d is formed in the wall 24b and extends horizontally, as viewed in FIG. 1, from the exterior to the interior of the well portion 24a. The opening 24d is sealed with a tube 26 inserted into the well portion 24a and sized to fit firmly against the wall 24b. The tube 26 comprises a relatively thin wall, non-magnetic metallic material such as aluminum or stainless steel. Two O-ring gaskets 28 are disposed between the tube 26 and the wall 24b in annular grooves 24e formed in the upper and lower inside portions of the wall 24b to further seal the opening 24d.

A magnetic wheel assembly 30 having a support structure 32 is secured to the base cover 24 via a plurality of screws, two of which are shown identified by the reference numerals 34a and 34b, which extend through the structure 32 into the base cover 24. The support structure 32 is composed of a plastic material such as Delrin or Kevlar and includes a bore 32a formed in the center thereof through which a shaft 36 is rotatably mounted. A slotted wheel 38 is attached to the top end of the shaft 36 and includes a slot 38a formed therein which extends radially and opens outwardly therefrom. The slotted wheel 38 further includes a boss 38b having a diameter approximately twice that of the shaft 36 for rotatably seating the slotted wheel 38 on the structure 32. A magnetic wheel 40 is coupled to the lower end of the shaft 36 and is thus disposed inside the tube 26. The magnetic wheel 40 is formed from a plastic injection molded material and incorporates a series of 20 magnetic poles (not shown) angularly spaced about the outer circumference of the wheel 40. The magnetic wheel 40 is diametrically sized so that a small gap will exist between the wheel 40 and the tube 26. A thrust washer 42 is disposed between the magnetic wheel 40 and the structure 32 to reduce surface contact therebetween and consequent wear on materials and drag on the fluid meter 10.

A Hall effect transducer 44 having two sensors, commonly known in the art, is mounted in the opening 24d such that the sensors abut the tube 26 and are thus located within close proximity to the magnetic wheel 40. The opening 24d is then sealed with a potting compound such as an epoxy material to further seal the opening 24d. Due to the proximity of the sensors to the wheel 40, the sensors can detect fluctuations in the magnetic influence of the magnetic poles of the wheel 40 when the wheel 40 rotates. In response to such detection, the transducer 44 generates a pulsed signal proportional to the rate of rotation of the wheel 40. The two sensors are, furthermore, horizontally spaced so that the direction of rotation of the magnetic wheel 40 can be determined by identifying which of the two sensors first detects the magnetic influence of a particular pole.

Figure 2A:
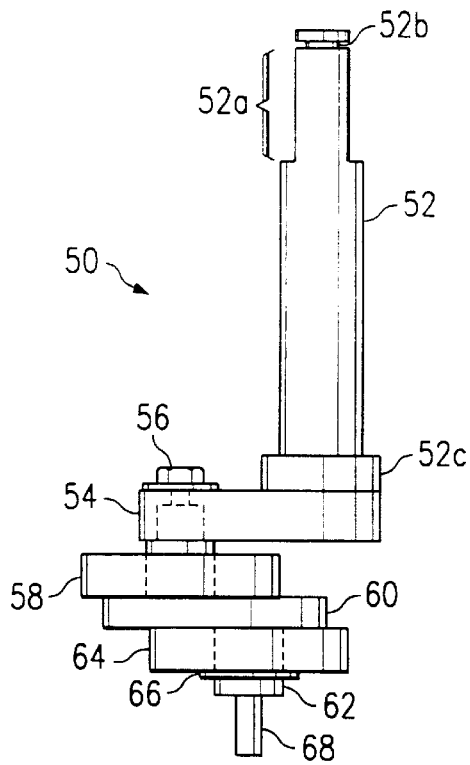
FIGS. 2A and 2B are elevational and bottom views, respectively, of a crankshaft of the meter of FIG. 1.
Figure 2B:
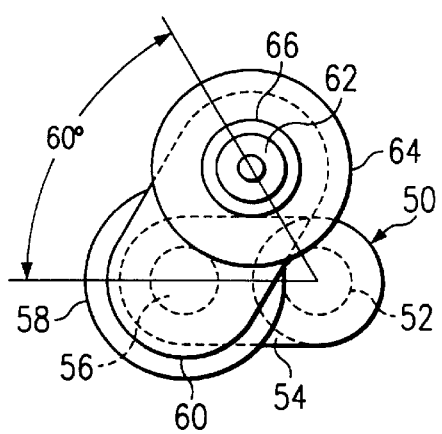

A bore 46 is formed in the top central portion of the flow meter body 12 and a ball bearing assembly 48 is fitted therein. A crankshaft 50 is rotatably disposed in the bearing assembly 48 and, as more clearly shown in FIGS. 2A and 2B, includes a straight vertically oriented upper shaft portion 52 which bears laterally against the bearing 48. An upper third 52a of the upper shaft portion 52 extends above the bearing assembly 48 and is shaped to receive a rotary valve discussed below with reference to FIGS. 3A and 3B below. A circumferential groove 52b is formed near the top end of the upper shaft portion 52a for receiving a snap ring, discussed below, to secure the crankshaft 50 in the bearing assembly 48. A ring portion 52c is formed at the lower end of the shaft portion 52 and bears upwardly against the bottom of the bearing assembly 48. A first link 54 is connected to the lower end of the upper portion 52 below the ring portion 52c and extends radially outwardly therefrom. A first crank pin 56 extends downwardly from the first link 54 through a first roller bearing 58 and into a second link 60. As best shown in FIG. 2B, relative to the crankshaft upper portion 52, the second link 60 is angularly offset from the first link 54 by 60°. A second crank pin 62 extends downwardly from the second link 60 through a second roller bearing 64 secured thereto with a snap ring 66 which resiliently fits into a circumferential groove appropriately formed in the lower end of the second crank pin 62. A pin 68 extends downwardly from the second crank pin 62 into the slot 38a for engaging the slotted wheel 38 and imparting rotary motion to the slotted and the magnetic wheels 38 and 40, respectively, when the crankshaft 50 is rotated.

Figure 4A:
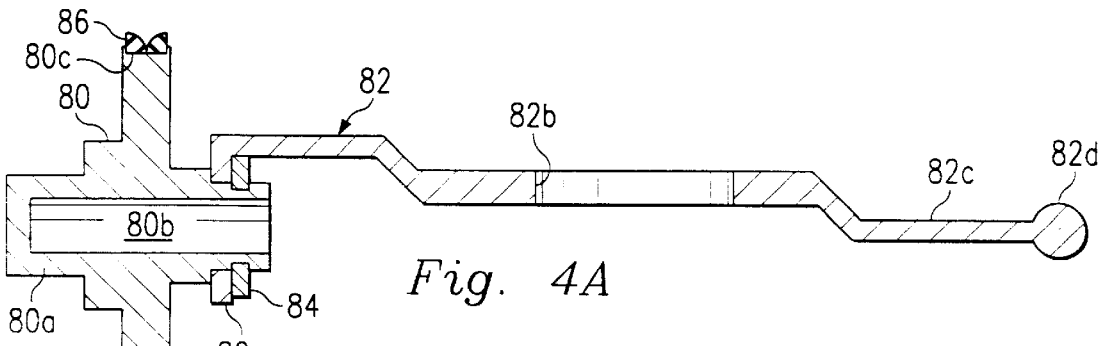
FIGS. 4A and 4B are elevational cross-sectional and plan views, respectively, of a connecting rod of the meter of FIG. 1.
Figure 4B:
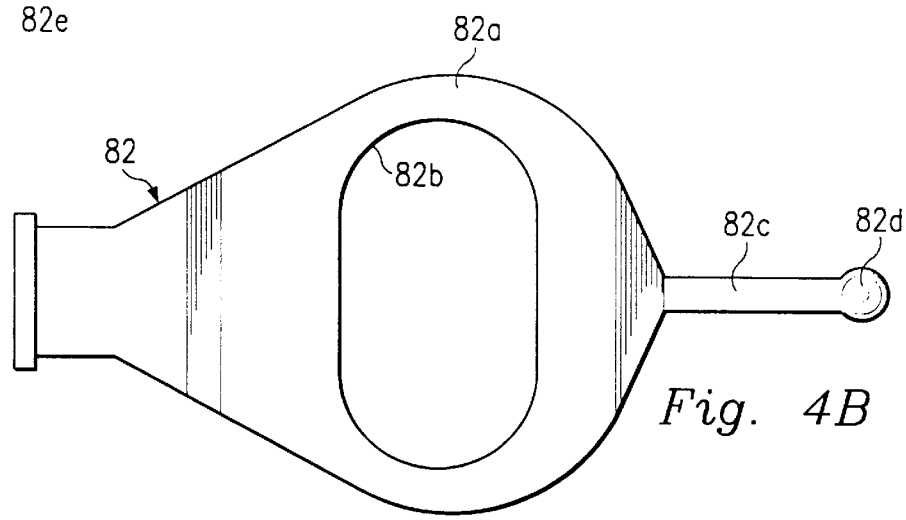

Referring to FIG. 1, the flow meter 10 further includes first and second pistons 80, 81 reciprocally disposed in the cylinders 16, 18. First and second connecting rods 82, 83 drivingly connect the respective pistons 80, 81 to the respective first and second roller bearings 58, 64, and hence to the crankshaft 50. The first piston 80 and connecting rod 82 are more clearly shown in FIGS. 4A and 4B. It is understood that the numbers shown in FIGS. 4A and 4B, when primed, refer to substantially identical aspects or components of the second piston 81 and connecting rod 83. Accordingly, the first and second connecting rods 82, 83 are formed from flat stock with Scotch yoke portions 82a, 82a' which are punched to provide oblong slotted yokes 82b, 82b' for slidingly engaging the respective first and second roller bearings 58, 64. Guide extensions 82c, 82c' extend longitudinally from the yoke portions 82a, 82a' and include spherically shaped end portions 82d, 82d'. Referring to FIG. 4A, the pistons 80, 81 include cylindrical guide chamber walls 80a, 80a' which define guide chambers 80b, 80b' each of which have one open end and an inside diameter sized for receiving the respective spherical end portion 82d', 82d. The pistons 80, 81 further include grooves 80c, 80c' circumscribed thereabout for receiving gaskets 86, 86' made of a resilient material such as Delrin. The connecting rods 82, 83 include, opposite the end portions 82d, 82d', connecting ring portions 82e, 82e' which slide onto the piston guide chamber walls 80a, 80a' and are secured thereto via snap rings 84, 84'. It is understood that the rods 82, 83 may be secured to the pistons 80, 81 using a number of techniques know in the art. For example, the piston rods 82, 83 may be welded or threaded onto the pistons 80, 81 or secured thereto by a bolt connection to a flange formed on the connecting rods 82, 83. It is further understood that, when disposed in the flow meter 10, the guide chambers 80b, 80b' receive and, in operation, guide the opposing end portions 82d', 82d of the respective second and first connecting rods 83, 82 to thereby facilitate reciprocation of the pistons 81, 80 in the cylinders 18, 16.

Referring to FIG. 1, it can be appreciated that the pistons 80, 81 delineate in the cylinders 16, 18 respective first and second inner ends 88, 90 having open communication with the crankcase portion 14, and respective first and second head end chambers 92, 94 opposing the inner ends 88, 90. It can be further appreciated that a crankcase chamber 96 is defined by the crankcase portion 14 in combination with the inner ends 88, 90. The gaskets 86, 86' circumscribing the pistons 80, 81 engage the cylinders 16, 18 and seal the head end chambers 92, 94 from the crankcase chamber 96.

Figure 5:
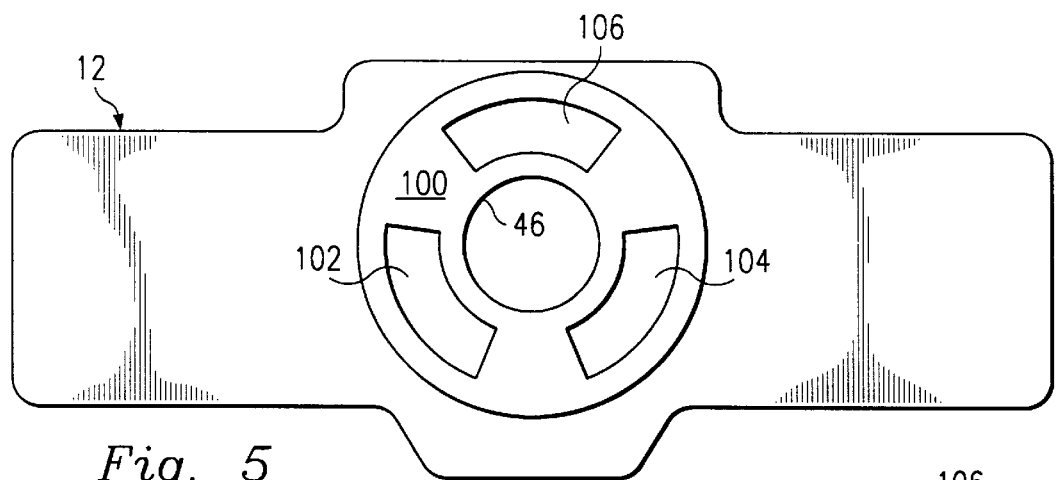
FIG. 5 is a plan view of a valve seat of the meter of FIG. 1 taken along the line 5—5 of FIG. 1.
Figure 6:
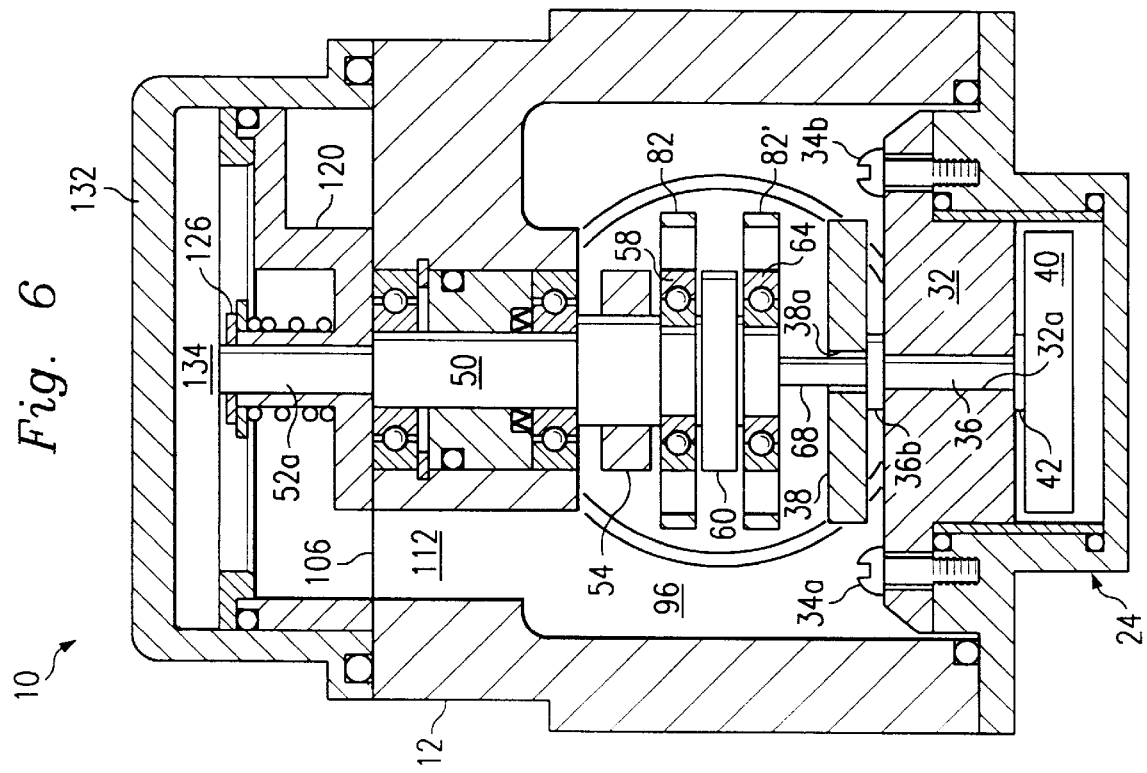
FIG. 6 is a cross-sectional view of the fluid meter of FIG. 1 taken along the line of 6—6 of FIG. 1.

As depicted in FIG. 5, taken along the line 5—5 in FIG. 1, a valve seat 100 is defined in the top central portion of the flow meter 10. The valve seat 100 includes first, second, and third, arcuate ports 102, 104, 106, respectively. Each of the ports 102, 104, 106 subtend an arc about the bore 46 of approximately 80° and are angularly spaced apart approximately 40° between ports. Referring to both FIGS. 1 and 5, the first port 102 is in fluid communication with the first head end chamber 92 via a first passageway 108 formed in the fluid meter body 12. The second port 104 is in fluid communication with the second head end chamber 94 via a second passageway 110 formed in the fluid meter body 12. Referring to FIGS. 5 and 6, the third port 106 is in fluid communication with the crankcase chamber 96 via a third passageway 112 formed in the fluid meter body 12.

Figure 3A:
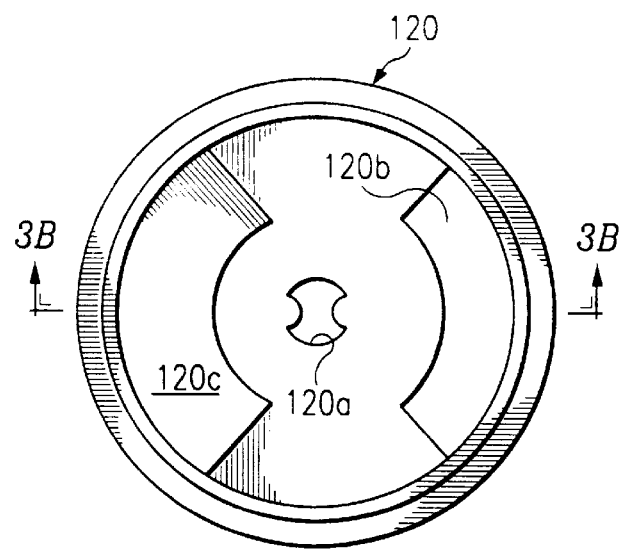
FIGS. 3A and 3B are plan and cross-sectional elevational views, respectively, of a rotary valve of the meter of FIG. 1.
Figure 3B:
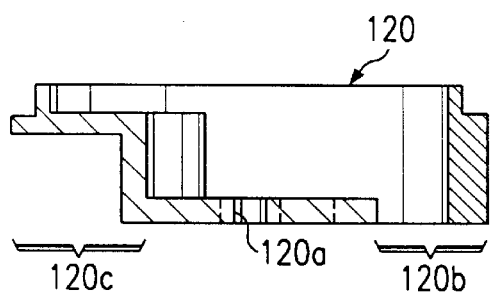

Referring to FIG. 1, a rotary valve 120 is positioned on top of the valve seat 100 to control the admission and discharge of a fluid into and out of the first, second, and third ports 102, 104, 106. The valve 120 is composed of a plastic material such as Delrin and, with reference to FIGS. 3A and 3B, includes a hole 120a formed in the center thereof through which the upper crankshaft portion 52a extends for rotatably coupling the valve 120 to the crankshaft 50. As shown in FIG. 1, a sleeve 122 and a coil spring 124 are fitted over the upper crankshaft portion 52a, until they rest on the rotary valve 120, and are secured thereto by a snap ring 126 placed in the groove 52b. The valve 120 and the crankshaft 50 are thus resiliently secured together longitudinally by the spring 124, though the downward movement of the spring 124 is limited by the sleeve 122 which prevents the spring 124 from compressing more than a predetermined amount. Referring to FIGS. 3A and 3B, the valve 120 further includes an arcuate inlet port 120b and an arcuate outlet port 120c axially and radially aligned to alternately register with the first, second, and third arcuate ports 102, 104, 106 of the valve seat 100 when the valve 120 is rotated by the crankshaft 50. Each of the ports 120b, 120c subtend an arc about the hole 120a of approximately 100° and are angularly spaced apart approximately 80° between ports.

As further shown in FIG. 1, a dome 132 is secured to the top of the flow meter body 12 and the rotary valve 120. A supply chamber 134 is formed in the dome 132 for supplying fluid to the inlet port 120b of the rotary valve 120. A supply port 136 formed in the dome 132 provides fluid communication between the supply chamber 134 and fluid supply lines (not shown). Similarly, an annular discharge chamber 138 is formed in the dome 132 about the supply chamber 134 for receiving fluid discharged from the outlet port 120c of the rotary valve 120. A discharge port 140 provides fluid communication between the discharge chamber 138 and fluid discharge lines (not shown).

Figure 7:
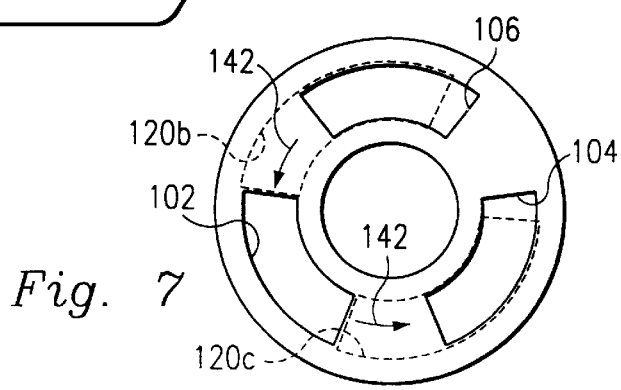
FIG. 7 is a plan view showing the ports of a rotary valve superimposed over a valve seat of the meter of FIG. 1.

FIG. 7 is a plan view depicting one instantaneous position of the rotary valve ports 120b, 120c (shown in phantom) superimposed over the first, second, and third ports 102, 104, 106 of the valve seat 100. In operation, the rotary valve 120 is rotated by the crankshaft 50 in a counterclockwise direction as indicated by the arrow 142. Accordingly, the inlet and outlet ports 120b, 120c sequentially register with each of the ports 102, 104, 106. As shown in FIG. 7, the inlet port 120b is registered with the third port 106 and the outlet port 120c is registered with the second port 104. Registration of the inlet port 120b with the first port 102 is depicted as impending. Because each of the ports 102, 104, 106 subtend an angle of approximately 80° and each of the rotary valve ports 120b, 120c subtend an angle of approximately 100°, each port 102, 104, 106 alternately registers with the inlet port 120b for 180° of rotation of the crankshaft 50 and then with the outlet port 120c for 180° of rotation. It can be appreciated that the inlet port 120b or the outlet port 120c may register with one or two, but not all three, of the ports 102, 104, 106 simultaneously. The ports 102, 104, 106 may, however, register with only one of the ports 120b, 120c at a time.

To more fully illustrate the operation of the flow meter 10, and with reference to FIG. 1, it will be assumed that, initially, the flow meter body 12 is filled with fluid, the crankshaft 50 is rotated to place the first piston 80 in as close proximity to the head cover 20 as possible (i.e., a "top dead center" position), the second piston 81 leads the first piston 80 by a phase angle of 60°, and the rotary valve ports 120b, 120c are related to the first, second, and third ports 102, 104, 106 as shown in FIG. 7. A fluid, such as gasoline from an external source (not shown), is then supplied through the supply port 136 and passed through the supply chamber 134, the inlet port 120b of the rotary valve 120, and, in accordance with FIG. 7, through the third port 106. The fluid then flows through the third passageway 112 (FIG. 6) and into the crankcase chamber 96 where it applies pressure to displace the second piston 81 outwardly (away from the crankshaft 50) (the first piston 80 resists outward movement since it is in a top dead center position). The outward movement of the second piston 81 expels fluid from the second chamber 94 thereby causing the fluid to pass through the second passageway 110, the second port 104, the discharge chamber 138, and out through the discharge port 140 to a discharge line (not shown). The movement of the second piston 81 also drives the crankshaft 50 via the second connecting rod 83. Accordingly, the crankshaft 50 imparts counterclockwise rotation to the rotary valve 120 and the inlet port 120b begins to register with the first port 102. Fluid in the supply chamber 134 then begins to flow through the inlet port 120b of the rotary valve 120 and through the first port 102. The fluid then flows through the first passageway 108 into the first chamber 92 and applies pressure to displace the first piston 80 inwardly (towards the crankshaft 50), thereby effecting further rotation of the crankshaft 50 and the rotary valve 120. The process continues according the principles described herein. As a result, the pistons 80, 81 reciprocate in the cylinders 16, 18, respectively, thereby rotating the crankshaft 50, the attached rotary valve 120, and the magnetic wheel 40. The sensors in the Hall effect transducer 44, detect the consequent fluctuation in the magnetic influence of the magnetic poles on the wheel 40, and generate a pulsed signal which is proportional to the flow rate of the fluid passing through the flow meter 10. Although not clear from the drawings, it is understood that the pulsed signal may be employed to drive an electronic counter and indicator for recording the volume and total value of fluid, such as gasoline, dispensed through the flow meter 10.

Table 1 shows the relative amount of fluid supplied to and discharged from each of the three chambers 92, 94, 96 of the flow meter 10 as the crankshaft 50 rotates through 30° increments. An initial reference angle of 0° is defined by the instantaneous position of the rotary valve as depicted in FIG. 7. Positive values indicate fluid supplied and negative values indicate fluid discharged.

| Angle of Rotation | First Chamber 92 | Second Chamber 94 | Crankcase Chamber 96 | Total Fluid In | Total Fluid Out |
|---|---|---|---|---|---|
| 0–30° | 0.27 | −1.00 | 0.73 | 1.00 | −1.00 |
| 30–60° | 0.73 | −1.00 | 0.27 | 1.00 | −1.00 |
| 60–90° | 1.00 | −0.73 | −0.27 | 1.00 | −1.00 |
| 90–120° | 1.00 | −0.27 | −0.73 | 1.00 | −1.00 |
| 120–150° | 0.73 | 0.27 | −1.00 | 1.00 | −1.00 |
| 150–180° | 0.27 | 0.73 | −1.00 | 1.00 | −1.00 |
| 180–210° | −0.27 | 1.00 | −0.73 | 1.00 | −1.00 |
| 210–240° | −0.73 | 1.00 | −0.27 | 1.00 | −1.00 |
| 240–270° | −1.00 | 0.73 | 0.27 | 1.00 | −1.00 |
| 270–300° | −1.00 | 0.27 | 0.73 | 1.00 | −1.00 |
| 300–330° | −0.73 | −0.27 | 1.00 | 1.00 | −1.00 |
| 330–360° | −0.27 | −0.73 | 1.00 | 1.00 | −1.00 |

As evident from the table, the inlet and outlet ports 120b, 120c and the ports 102, 104, 106 cooperate such that the volume of fluid admitted to, or withdrawn from, the crankcase chamber 96 is equal to the algebraic sum of the volume respectively withdrawn from, or admitted to, the head end chambers 92, 94. Thus the crankcase chamber 96 provides what may be termed a "blind" or "hypothetical" piston and cylinder, mechanically and hydraulically cooperating with the pistons 80, 81 which are structurally existent. Thus the meter operates hydraulically and mechanically like a three piston meter or hydraulic motor although it only has the physical components of a two piston meter or motor. It should be noted that the flow into and out of the flow meter 10 is substantially constant. This constant flow results from reciprocating the axially-aligned pistons 80, 81 sixty degrees out of phase and from utilizing Scotch yokes 82b, 82b' which are substantially harmonic.

Figure 8:
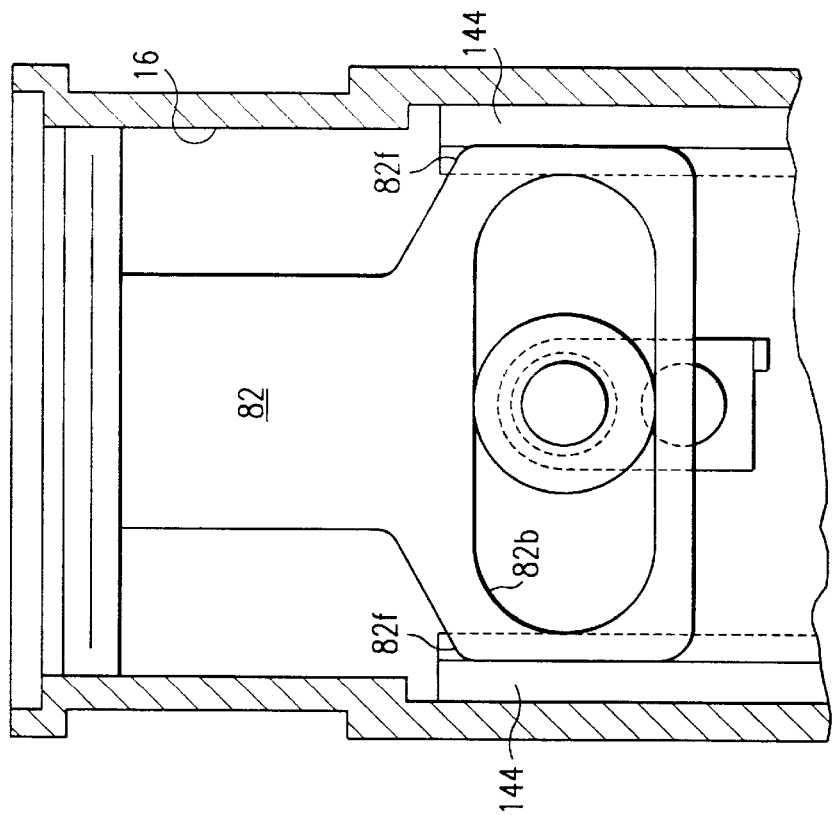
FIG. 8 is a plan view of an alternative connecting rod that may be employed in the meter of FIG. 1.

FIG. 8 shows an alternative connecting rod 82 that may be utilized having straight guide edges 82f which reciprocate along guide rails 144 provided in the crankcase 14 as the piston 80 reciprocates in the cylinder 16 thereby rendering the guide end portion 82d and corresponding guide chamber 80b unnecessary. It is understood that less harmonic conventional connecting rods having circular rather than oblong yokes 82b, 82b' and which thus do not require any supplemental guiding may also be used.

Figure 9:
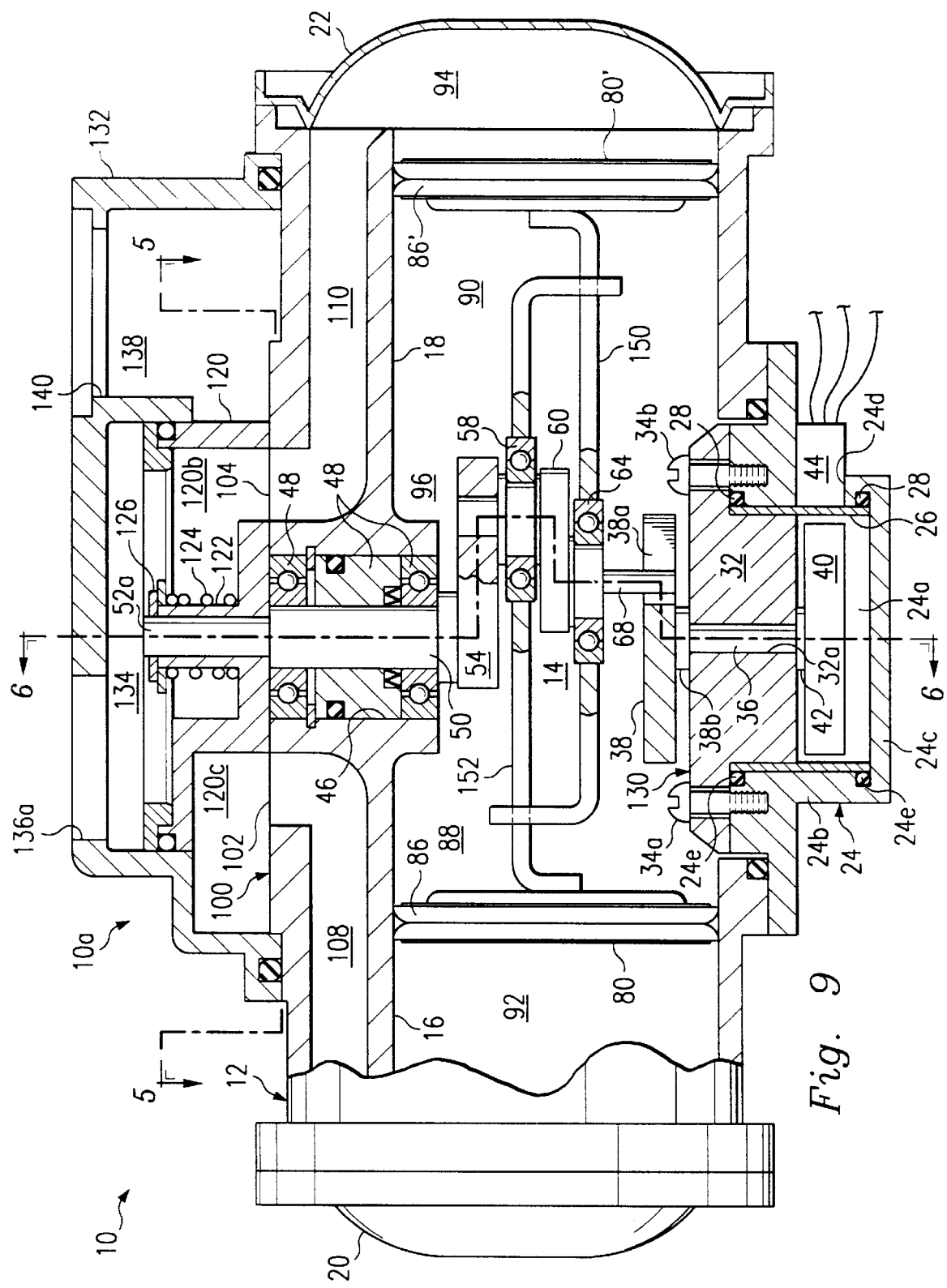
FIG. 9 is a view similar to FIG. 1 but depicting an alternate embodiment of the fluid meter of the present invention.
Figure 10:
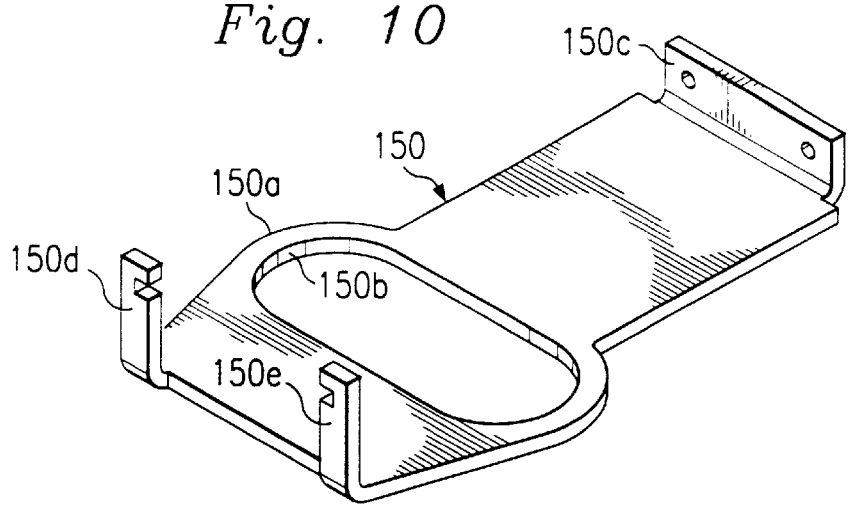
FIG. 10 is an isometric view of a connecting rod of the embodiment of FIG. 9.
Figure 11:
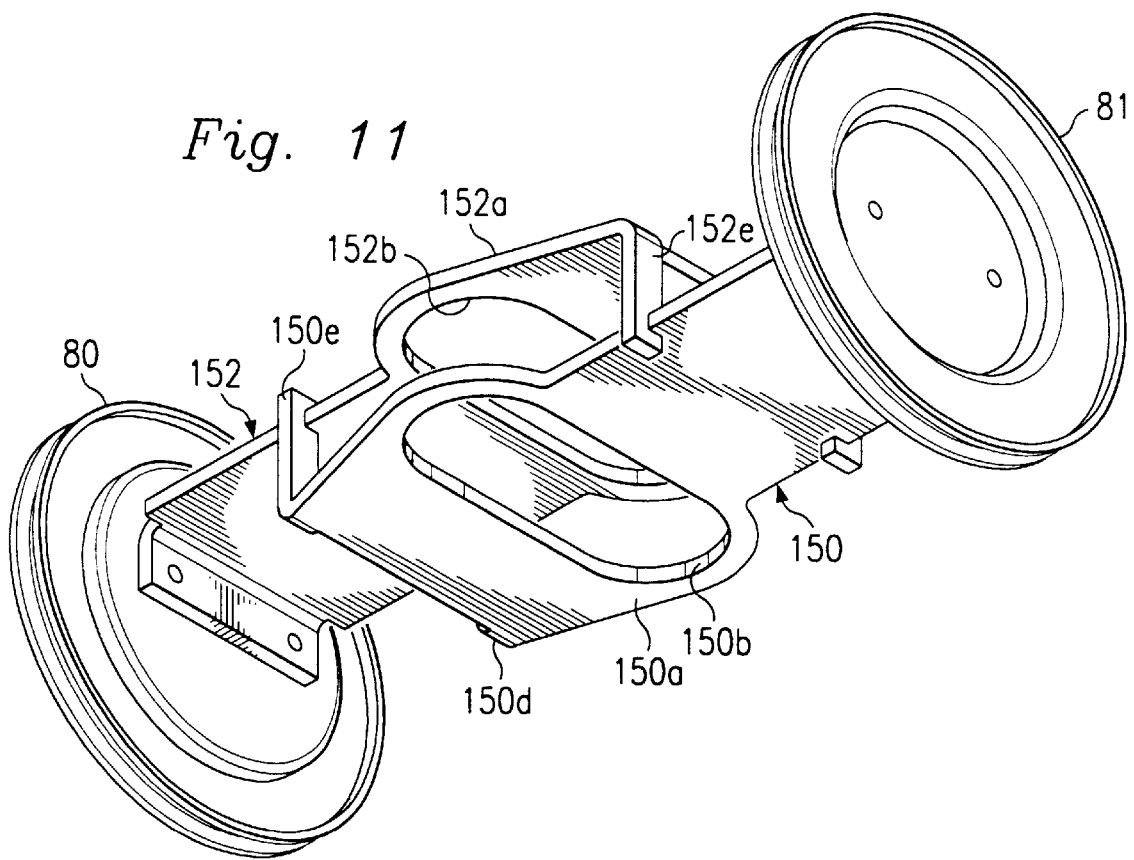
FIG. 11 is a view similar to FIG. 10 but showing two connecting rods of the embodiment of FIG. 9.

According to the embodiment of FIGS. 9–11, a flow meter 10a is provided which is identical to the flow meter 10 of FIGS. 1–8 with the exception that the connecting rods 82 and 83 of the flow meter 10 have been replaced by connecting rods 152 and 150 respectively, in the flow meter 10a. The connecting rod 150 is better shown in FIG. 10 and is formed from flat stock including a yoke portion 150a through which an elongated slot 150b extends for receiving the bearings 58. A connecting tab 150c is formed at one end portion of the connecting rod 150 by bending the latter portion at right angles to the remaining portion of the connecting rod. Two openings are provided in the tab 150c for receiving bolts, or the like (not shown), for attaching the connecting rod 150 to the piston 81 (FIG. 1).

Two spaced guide tabs 150d and 150e are provided at the other end portion of the connecting rod 150, which corresponds to the distal end of the yoke portion 150a. The guide tabs 150d and 150e are formed by bending the latter end portion at right angles to the plane of the connecting rod 150 and cutting away a portion of the end portion extending between the tabs. Each tab 150d and 150e is provided with a guide notch for reasons to be described.

FIG. 11 depicts the connecting rod 150 attached to the piston 81 along with a connecting rod 152 which is attached to the piston 80 and which is identical to the connecting rod 150. For the convenience of presentation, the bearing 58, which extends in the yoke 150b of the connecting rod 150, and the bearing 64, which extends in the corresponding yoke of the connecting rod 152 are not shown in FIG. 11, since they function in the same manner as shown and described in connection with the embodiment of FIGS. 1–7.

A portion of each of the opposite edge portions of the connecting rod 152 extend in the notches in the guide tabs 150d and 150e of the connecting rod 150. Likewise, a portion of each of the opposite edge portions of the connecting rod 150 extend in the notches in the corresponding guide tabs of the connecting rod 152. Therefore, during the reciprocal movement of the pistons 80 and 81 as described above, the connecting rod 150 supports and guides the connecting rod 152, and the connecting rod 152 supports and guides the connecting rod 150.

Figure 12:
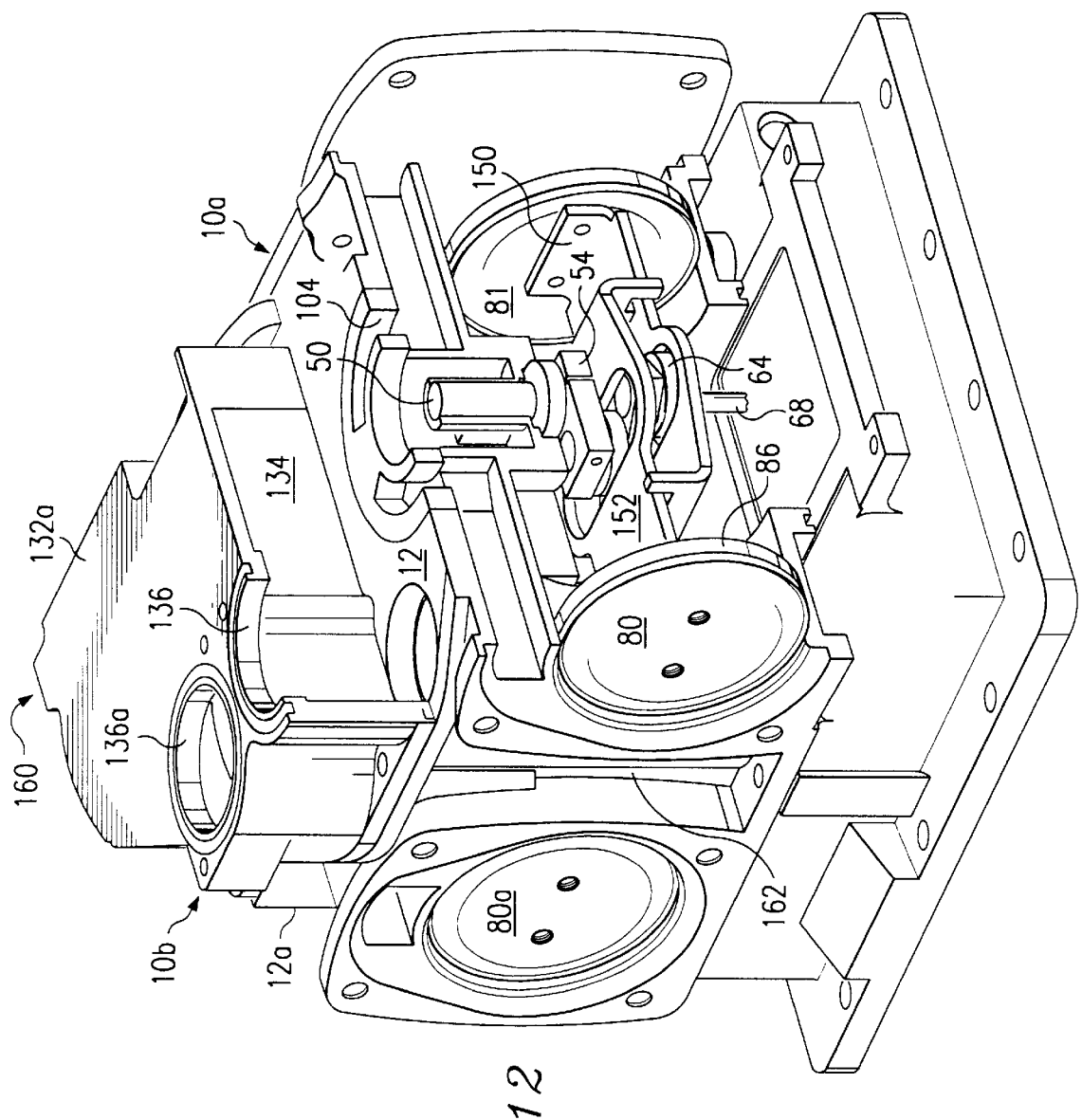
FIG. 12 is a isometric view of a unitary assembly incorporating two fluid meters similar to the meter of FIGS. 9–11.

It is understood that multiple flow meters may be integrated into a single unitary assembly to gain several advantages over the single flow meter described above. For example, a multiple flow meter wherein two fluid meters are integrated together facilitates the construction of gasoline dispenser pump stations having two, four, six, or eight gasoline dispensers. Such an example is shown in FIG. 12 which contains the flow meter 10a of FIGS. 9–11 in addition to an identical flow meter 10b mounted adjacent the flow meter 10a within a single housing, shown in general by the reference numeral 160. To this end, the housing 160 encloses the flow meter body 12 of the embodiment of FIGS. 9–11 and an additional flow meter body 12a which is a mirror image of the body 12. A partition 162 separates the meter bodies 12 and 12a, and the housing 160 includes a dome 132a that extends over both of the meter bodies.

Several components of the flow meter 10a, including the cover plate 20, the magnetic wheel assembly 30, the transducer 44, the rotary valve 120, and the outlet port 140 have been omitted from FIG. 12 in the interest of clarity. Since the meter 10b is identical to the valve 10a only a portion of the former valve is shown in FIG. 12. In this context, the meter 10b includes a pair of pistons, one of which is shown by the reference numeral 80a, which are identical to the pistons 80 and 81.

The meters 10a and 10b are oriented in the housing 160 so that their respective pistons 80 and 80a are aligned in the same plane, while the piston 81 of the meter 10a is aligned in the same plane as the corresponding piston (not shown) of the meter 10b. Also, the connecting rods 150 and 152 of the meter 10a extend parallel to the connecting rods (not shown) of the meter 10b.

An inlet port 136a extends through the dome 132a and is identical to the inlet port 136 of the meter 10a with the exception that it is located so as to supply fluid to a chamber (not shown) of the meter 10b that is identical to the chamber 134 of the meter 10a. In this context, an outlet port (not shown) would also be provided through the dome 132a for discharging fluid from the latter chamber of the meter 10b.

In operation, the meter 10b would function in an identical manner as described above in connection with the operation of the meter 10a. In this context a single inlet port or conduit could be provided which supplies the fluid to the inlet ports 136 and 136a of the meters 10a and 10b, respectively, so that they can operate independently, or simultaneously, as needed.

It can be appreciated that the multiple meter assembly of FIG. 12 eliminates the need for two separate houses, or meter bodies, along with their associated components, and is therefore relatively compact and cost efficient especially since manufacturing costs are considerably reduced. Also, installation of multiple flow meters is facilitated as a result of simplified mounting and pipe work and the reduced cabinet size required. Flexibility is also enhanced because a multiple flow meter could also serve a single hose outlet at twice the speed of delivery of a single unit flow meter.

It is understood that several variations may be made in the foregoing without departing from the scope of the invention. For example, the provision of two meters in the embodiment of FIG. 12 is shown by way of example only and additional meters, preferably in multiples of two arranged as shown in FIG. 12, could be employed. It is also understood that the multiple meter assembly of FIG. 12 could incorporate the connecting rods and associated components of FIGS. 1–8. Further, in each of the embodiments, the ports 102, 104, 106, 120b, 120c may subtend arcs of a number of different angles and, moreover, may have non-arcuate shapes. Also, the supply port 136 and the discharge port 140 may instead be utilized as discharge and supply ports respectively. Furthermore, the supply and discharge lines connected thereto may be arranged for measuring the volume of any fluid that flows through any line. For example, in addition to measuring a fluid, such as gasoline, that flows from a dispenser, the meter could be used to measure the volume of water flowing from a pipe into a structure such as a residential house or other building.

It is understood that other variations in the present invention are contemplated and in some instances, some features of the invention can be employed without a corresponding use of other features. Accordingly, it is appropriate that the appended claims be construed broadly in a manner consistent with the scope of the invention.

What is claimed is:

1. A multiple meter assembly comprising:
   a housing having two fluid inlets and two fluid outlets;
   a first meter disposed in the housing and comprising:
      an enclosure formed in the housing, communicating with one of the inlets and one of the outlets, and defining at least one cylinder for receiving the fluid,
      a piston mounted in the cylinder for reciprocal movement in response to the flow of fluid through the cylinder,
      a crankshaft disposed in the enclosure, and
      a connecting rod connected to the piston and to the crankshaft for rotating the crankshaft in response to the movement of the piston to pass the fluid from the one inlet through the enclosure and to the one outlet; and
   a second meter disposed in the housing and comprising:
      an additional enclosure formed in the housing, communicating with the other inlet and the other outlet and defining at least one additional cylinder for receiving the fluid,
      an additional piston mounted in the additional cylinder for reciprocal movement in response to the flow of fluid through the additional cylinder,
      an additional crankshaft disposed in the additional enclosure, and
      an additional connecting rod connected to the additional piston and to the additional crankshaft for rotating the additional crankshaft in response to the movement of the additional piston to pass the fluid from the other inlet through the enclosure and to the other outlet.

2. The assembly of claim 1 where the fluid passes from the one inlet, through the first-mentioned cylinder, and from the first-mentioned cylinder through the one outlet; and from the other inlet, through the additional cylinder, and from the additional cylinder through the other outlet.

3. The assembly of claim 2 wherein ports are defined in the first and second enclosures for communicating the corresponding inlets and outlets with the corresponding cylinders, and further comprising two valve assemblies respectively mounted on the crankshafts for rotation therewith and having a plurality of ports for sequentially registering with the ports in the enclosures for distributing fluid into and from the cylinders to control the movement of the pistons.

4. The assembly of claim 1 wherein the first meter comprises two pistons and two connecting rods respectively connecting the pistons to the crankshaft, the connecting rods being axially aligned; and wherein the second meter comprises two additional pistons and two additional connecting rods respectively connecting the additional pistons to the additional crankshaft, the additional connecting rods being axially aligned.

5. The assembly of claim 4 wherein the first-mentioned two connecting rods extend parallel to the additional two connecting rods.

6. The assembly of claim 4 wherein a portion of each of the first-mentioned connecting rods engage the other first-mentioned connecting rods to support and guide the first-mentioned connecting rods during the movement; and wherein a portion of each of the additional connecting rods engage the other additional connecting rods to support and guide the additional connecting rods during the movement.

7. The assembly of claim 4 wherein the two connecting rods of each meter are respectively connected to their corresponding crankshaft by crank pins that are radially offset from the crankshaft so that the corresponding pistons reciprocate substantially sixty degrees out of phase.

8. The assembly of claim 7 wherein the connecting rods have slotted yokes for receiving their corresponding crank pins.

9. The assembly of claim 8 wherein the crank pins slide in their corresponding yokes transversely to the direction of the reciprocating motion of their corresponding pistons.

10. The assembly of claim 8 wherein notches are formed in the guide tabs for respectively receiving the corresponding opposed side edge portions.

11. The assembly of claim 1 wherein each connecting rod has a pair of guide tabs engaging the opposed side edge portions of its corresponding rod.

12. The assembly of claim 1 further comprising at least one wheel coupled to each crankshaft and having at least one magnetic pole, and at least one sensor positioned in each enclosure to detect the influence of its corresponding magnetic pole and to generate a signal corresponding to the flow of the fluid into and from the corresponding cylinders.

13. A multiple meter assembly comprising a housing defining a first subhousing having a first fluid inlet for receiving fluid and a first fluid outlet for discharging the fluid, and a second subhousing having a second fluid inlet for receiving fluid and a second fluid outlet for discharging the fluid; a first meter disposed in the first subhousing and comprising a first piston mounted in the first subhousing for reciprocal movement in response to the flow of fluid through the first subhousing, a first crankshaft mounted for rotational movement in the first subhousing, and a first connecting rod connected to the first piston and to the first crankshaft for rotating the first crankshaft in response to the movement of the first piston; a second meter disposed in the second subhousing and comprising a second piston mounted in the second subhousing for reciprocal movement in response to the flow of fluid through the second subhousing, a second crankshaft mounted for rotational movement in the second subhousing, and a second connecting rod connected to the second piston and to the second crankshaft for rotating the second crankshaft in response to the movement of the second piston; a first transducer disposed in the first subhousing and responsive to movement of the first crankshaft for generating a first output signal; and a second transducer disposed in the second subhousing and responsive to movement of the second crankshaft for generating a second output signal.

14. The assembly of claim 13 wherein the first meter further comprises a first cylinder in which the first piston reciprocates and which receives fluid from the first inlet for driving the first piston, the latter fluid discharging from the first cylinder to the first outlet; and wherein the second meter further comprises a second cylinder in which the second piston reciprocates and which receives fluid from the second inlet for driving the second piston, the latter fluid discharging from the second cylinder to the second outlet.

15. The assembly of claim 14 wherein the housing further comprises a dome extending over the housing and the subhousings, the first and second inlets and the first and second outlets extending through the dome.

16. The assembly of claim 15 wherein a first series of ports are defined in the first subhousing for communicating the first inlet and the first outlet with the first cylinder; and wherein a second series of ports are defined in the second subhousing for communicating the second inlet and the second outlet with the second cylinder.

17. The assembly of claim 16 further comprising a first valve assembly mounted on the first crankshaft and having a plurality of ports for sequentially registering with the first series of ports for distributing fluid into and from the first cylinder to control the movement of the first piston; and a second valve assembly mounted on the second crankshaft and having a plurality of ports for sequentially registering with the second series of ports for distributing fluid into and from the second cylinder to control the movement of the second piston.

18. A multiple meter assembly comprising a housing defining a first subhousing having a first fluid inlet for receiving fluid and a first fluid outlet for discharging the fluid, and a second subhousing having a second fluid inlet for receiving fluid and a second fluid outlet for discharging the fluid; a first meter disposed in the first subhousing and comprising two pistons mounted in the first subhousing for reciprocal movement in response to the flow of fluid through the first subhousing, a first crankshaft mounted for rotational movement in the first subhousing for generating a first output signal, and two axially aligned connecting rods respectively connecting the two pistons to the first crankshaft for rotating the first crankshaft in response to the movement of the pistons; and a second meter disposed in the second subhousing and comprising two pistons mounted in the second subhousing for reciprocal movement in response to the flow of fluid through the second subhousing, a second crankshaft mounted for rotational movement in the second subhousing for generating a second output signal, and two axially aligned connecting rods respectively connecting the latter two pistons to the second crankshaft for rotating the second crankshaft in response to the movement of the latter pistons.

19. The assembly of claim 18 wherein the two connecting rods of the first meter extend parallel to the two connecting rods of the second meter.

20. The assembly of claim 18 wherein a portion of each of the two connecting rods of the first meter engages the other connecting rod of the first meter to support and guide the connecting rods of the first meter during the movement of the first piston; and wherein a portion of each of the two connecting rods of the second meter engages the other connecting rod of the second meter to support and guide the connecting rods of the second meter during the movement of the second piston.

21. The assembly of claim 20 further comprising crank pins connecting the two connecting rods of each meter to their corresponding crankshaft, the crank pins being radially offset from the crankshaft so that the corresponding pistons reciprocate substantially sixty degrees out of phase.

22. The assembly of claim 21 wherein the connecting rods of each meter have slotted yokes for receiving their corresponding crank pins.

23. The assembly of claim 22 wherein the crank pins slide in their corresponding yokes transversely to the direction of the reciprocating motion of their corresponding pistons.

24. The assembly of claim 18 wherein each connecting rod has a pair of guide tabs engaging the opposed side edge portions of its corresponding connecting rod.

25. The assembly of claim 24 wherein notches are formed in the guide tabs for respectively receiving the corresponding opposed side edge portions of the corresponding connecting rod.

26. A multiple meter assembly comprising a housing defining a first subhousing having a first fluid inlet for receiving fluid and a first fluid outlet for discharging the fluid, and a second subhousing having a second fluid inlet for receiving fluid and a second fluid outlet for discharging the fluid; a first meter disposed in the first subhousing and comprising a first piston mounted in the first subhousing for reciprocal movement in response to the flow of fluid through the first subhousing, a first crankshaft mounted for rotational movement in the first subhousing, and a first connecting rod connected to the first piston and to the first crankshaft for rotating the first crankshaft in response to the movement of the first piston; a second meter disposed in the second subhousing and comprising a second piston mounted in the second subhousing for reciprocal movement in response to the flow of fluid through the second subhousing, a second crankshaft mounted for rotational movement in the second subhousing, and a second connecting rod connected to the second piston and to the second crankshaft for rotating the second crankshaft in response to the movement of the second piston; a first wheel coupled to the first crankshaft and having at least one magnetic pole; a first sensor disposed in the first subhousing for detecting the influence of the magnetic pole and for generating an output signal; a second wheel coupled to the second crankshaft and having at least one magnetic pole; and a second sensor disposed in the second subhousing for detecting the influence of the latter magnetic pole and for generating an output signal.

\* \* \* \* \*